(No Model.) 2 Sheets—Sheet 1.

R. HOWARTH.
APPARATUS FOR SEPARATING DUST FROM THE AIR.

No. 306,757. Patented Oct. 21, 1884.

Fig. 1.

Fig. 2.

Witnesses:
Thomas A. Foulkes
John S. Knott

Inventor:
Ralph Howarth
per Boshardt & Grant
Attorneys.

(No Model.) 2 Sheets—Sheet 2.
R. HOWARTH.
APPARATUS FOR SEPARATING DUST FROM THE AIR.
No. 306,757. Patented Oct. 21, 1884.

Witnesses:
Thomas A. Foulkes
John S. Knott

Inventor:
Ralph Howarth
per Bophard & Grant
Attorneys.

UNITED STATES PATENT OFFICE.

RALPH HOWARTH, OF ROCHDALE, COUNTY OF LANCASTER, ENGLAND.

APPARATUS FOR SEPARATING DUST FROM THE AIR.

SPECIFICATION forming part of Letters Patent No. 306,757, dated October 21, 1884.

Application filed February 18, 1884. (No model.) Patented in England December 14, 1881, No. 5,457; in Germany June 29, 1882, No. 21,426; in France July 1, 1882, No. 149,872; in Belgium July 1, 1882, No. 58,357, and in Austria November 1, 1882, No. 24,770.

*To all whom it may concern:*

Be it known that I, RALPH HOWARTH, a subject of the Queen of Great Britain, residing at Rochdale, in the county of Lancaster, England, have invented certain new and useful Improvements in Apparatus for Separating Dust from the Air Discharged or Drawn from Millstones, Purifiers, or other Analogous Machines, (for which I have obtained a patent in Great Britain, No. 5,457, bearing date December 14, 1881; Germany, No. 21,426, June 29, 1882; France, No 149,872, July 1, 1882; Belgium, No. 58,357, July 1, 1882; Austria, No. 24,770, November 1, 1882;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in apparatus for separating dust from the air discharged by or drawn from millstones, purifiers, or other analogous machines; and the object of my improvements is to cause the flannel or filtering material fixed in the form of pockets, and generally employed in such apparatus, to be worked and expanded in a horizontal direction from one side of the frame to which it is attached through to the other side of the same frame, and to close the dust-laden-air inlet-opening during a part of such operation, for the purpose of producing momentarily a strong partial vacuum on the dust-laden side of the flannel, which assists in removing the dust collected thereon, thus keeping the pores of the flannel open and separating the dust from the air more effectually. I attain this object by the apparatus in the accompanying two sheets of drawings, in which—

Figure 3:
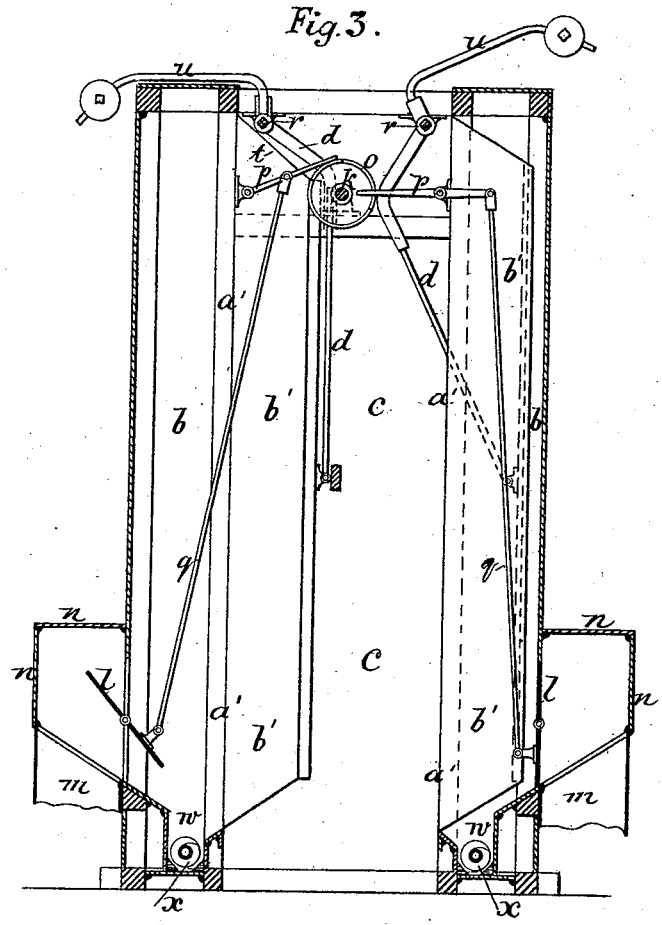
Figure 4:
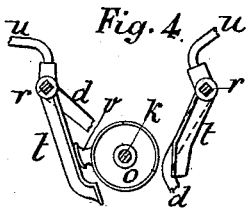
Figure 5:
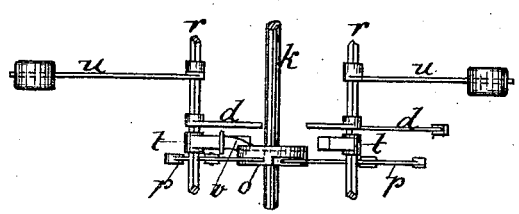

Figure 1 is an end view of the machine. Fig. 2 is a plan in section of Fig. 1 on the line A B. Fig. 3 is a vertical section of the machine. Fig. 4 is a front view of the device for working the filtering material. Fig. 5 is a plan of the devices for working the inlet-valves and filtering material.

Similar letters refer to similar parts throughout the several views.

The box $a$, Figs. 1, 2, 3, formed of wood, is divided into three vertical compartments, $b\ b$ and $c$, by partitions formed of a framing, $a'$, and filtering material $b'$. The latter is arranged preferably in a zigzag shape, forming pockets $b'$, and suitably suspended and connected at alternate points to the frame $a'$. The compartments $b\ b$ are for the reception of the dust-laden air drawn from millstones, purifiers, or other analogous machines, and the compartment $c$ is for the escape of the purified air. A driving-shaft, $e$, situated at the end near the top of the apparatus, is carried by brackets $f\ f$ and provided with two pulleys, $g$ and $h$, and worm $i$, which latter gears into the worm-wheel $j$, fixed on the main shaft $k$. Throttle-valves $l\ l$ are employed and situated at the sides of the apparatus, for the purpose of closing and opening alternately the dust-laden-air inlet-openings $m\ m$. Trunks $n\ n$ are fixed in front of the inlet-opening $m\ m$, which convey the dust-laden air, by means of the inlet-openings $m\ m$, to the dust-receiving compartments $b\ b$. The main shaft $k$ carries the cam $o$, which, during a part of its revolution, actuates the levers $p\ p$, the latter being connected by means of rods $q\ q$ to the throttle-valves $l\ l$, in order to control the admittance of the dust-laden air at suitable intervals. Square shafts $r\ r$, provided with shaking-levers $d\ d$ and levers $t\ t$, are arranged to rock in suitable bearings near or on the top of the machine. The extreme ends of the shaking-levers $d\ d$ are connected to the pockets of the filtering material $b'\ b'$ by means of small brackets forming hinges. These brackets are fixed on strips of wood, the latter being suitably fastened to the points of the pockets $b'\ b'$. A to-and-fro motion is imparted to the said pockets by means of the pawl $v$, forming a part of the cam $o$ on the shaft $k$, and acting alternately upon the levers $t\ t$ when rotated, thus causing the shaking-levers $d\ d$ to move the flannel or filtering material and expand alternately the pockets $b'\ b'$ in compartments $b\ b$ and compartment $c$. On the square shafts $r\ r$ are also fixed levers $u\ u$, provided with weights, which, after the contact of the pawl $v$ with the levers $t\ t$, cause the shaking-levers $d\ d$ to fall quickly back and shake the filtering material. The inlet-opening $m\ m$ being at such time closed by the throttle-valves $n\ n$, a momentary strong partial vacuum on the dust-laden side of the flannel is produced, which sucks the air through the flannel at the moment it is shaken, thus removing the dust collected thereon and keeping the pores of the flannel open for the purpose of the escape of the purified air. The dust which has collected on the filtering material is thereby effectually removed thereoff and falls into the hoppers $w\ w$, in which the Archimedean screws $x\ x$ are caused to rotate, which delivers the dust to the end of the hoppers $w\ w$, and discharges the same through the exits $y\ y$ into suitable receivers. The said Archimedean screws $x\ x$ receive motion by means of bevel-wheels $z\ z$ and the cross-shaft $d'$, situated at the lower end of the apparatus and driven by means of a belt and pulley, $c'$, from the worm-shaft and pulley $g$.

The action of the apparatus is as follows: The dust-laden air, after being drawn from the millstones, purifiers, or other analogous machines, is forced into the trunks $u\ u$. The inlet-valves $l\ l$ are then opened alternately, and the compartments $b\ b$ respectively receive a charge of dust-laden air, which is forced against the pockets of the filtering material $b'\ b'$. The latter, being at such time expanded in compartments $c$, separates the dust from the air and permits the purified air to escape into the compartment $c$. After a certain interval the inlet-valve of one compartment is closed and the shaking motion belonging to that one compartment commences its functions, and causes, first, the pockets $b'\ b'$ to move and expand in the dust-laden-air receiving-compartment $b$, and afterward to fall quickly back to its former or original position in compartment $c$, causing a momentary vacuum, such vacuum and shaking effectually removing all the dust which has collected on the filtering material. The inlet-valve of that compartment is then opened and the dust-laden air readmitted. It will thus be understood that the formation of a partial vacuum on the dust-laden side of the flannel or filtering material during the time the latter is caused to return to its original position in compartment $c$ by the shaking motion described is obtained by closing the respective inlet-valve during a part of such operation.

The partial vacuum, formed in the manner described, assists in keeping the flannel or filtering material always porous, thus causing the dust from the air to be separated more effectually. The dust separated from the air drops into the hoppers $w\ w$, and is then discharged through the exit $y\ y$ by means of the Archimedean screws $x\ x$, and afterward collected into suitable receptacles.

Having thus described my invention, I claim as new and desire to secure by Letters Patent—

An apparatus for separating dust from air, comprising the compartments $b\ b$, for the reception of the dust-laden air, the compartment $c$, for the escape of the purified air, the frames $a'\ a'$, the filtering material $b'$, forming two sets of pockets, suitable mechanism for horizontally moving said pockets into and out of compartment $c$, and suitable mechanism for alternately admitting the dust-laden air into and shutting it out from the compartments $b\ b$ at certain intervals, and for producing a partial vacuum in said compartments $b\ b$, substantially as described.

RALPH HOWARTH.

Witnesses:
 TOM FOULKES,
 FERDINAND BOSSHARDT.